United States Patent [19]
Fujino et al.

[11] Patent Number: 4,464,033
[45] Date of Patent: Aug. 7, 1984

[54] CAMERA AND RELEASE DEVICE THEREFORE

[75] Inventors: Masahisa Fujino; Akio Sunouchi, both of Tokyo; Tatsuo Konno; Ryuji Suzuki, both of Kanagawa, all of Japan

[73] Assignee: Canon Kabushiki Kaisha, Tokyo, Japan

[21] Appl. No.: 361,839

[22] Filed: Mar. 25, 1982

[30] Foreign Application Priority Data

Apr. 2, 1981 [JP] Japan .................................. 56-50361

[51] Int. Cl.³ ............................................ G03B 17/38
[52] U.S. Cl. .................................................. 354/266
[58] Field of Search ............... 354/234, 266, 267, 268, 354/269

[56] References Cited

U.S. PATENT DOCUMENTS

| | | | |
|---|---|---|---|
| 3,922,693 | 11/1975 | Matsui | 354/234 |
| 4,024,553 | 5/1977 | Maitani et al. | 354/268 |
| 4,051,498 | 9/1977 | Kitai | 354/234 |
| 4,134,658 | 1/1979 | Suzuki et al. | 354/266 |
| 4,274,727 | 6/1981 | Nemoto et al. | 354/266 |

*Primary Examiner*—A. A. Mathews
*Attorney, Agent, or Firm*—Toren, McGeady and Stanger

[57] ABSTRACT

The disclosed camera ordinarily uses an electromagnetic release device. A supplemental mechanical release device is enabled only when the electromagnetic release device's battery is absent from the battery case. The release operation is then carried out by the mechanical release device.

6 Claims, 5 Drawing Figures

CAMERA AND RELEASE DEVICE THEREFORE

BACKGROUND OF THE INVENTION

1. Field of the Invention

The present invention relates to a camera and to a shutter release device for a camera. The invention relates more particularly to a release change over device for automatically shifting the operation of an electronic camera from an electromagnetic release mechanism in which an electromagnetic solenoid responds to a switch operative with a shutter button to a mechanical release mode.

2. Description of the Prior Art

In a camera with an electromagnetic release mechanism, the operation of the shutter button can be made soft to the touch, while an electric self-timer and various types of remote controls can be used. This improves operation of the camera. Further, when an electromagnetic release mechanism is applied to a modern motor driven camera on which an automatic winder or a motor drive device is mounted, mechanical engagement is unnecessary because it is possible to electrically transmit the control signal of the release operation. Hence there is little restriction on the lay-out of the transmission mechanism, which makes the arrangement very convenient. On the other hand, in a camera provided with an electromagnetic release mechanism, the camera can not be used at all when the battery therefor is discharged. Various proposals have been made to overcome this inconvenience. In one example, a separate mechanical release mechanism, completely independent from the electromagnetic release mechanism, is arranged to operate so that in case of necessity the camera is mechanically operated. As disclosed in Japanese Patent Publication No. Sho 53-45232, the electromagnetic release is changed over into the mechanical release by means of the change over operation member. The operation in the former case has a feeling quite different from that of the proper electromagnetic release of the camera, and misoperation is apt to take place; while in the latter case the stroke length of the shutter button is different when operating the electromagnetic release and the mechanical release. This is inconvenient.

SUMMARY OF THE INVENTION

In order to enable the change over between the electromagnetic release and the mechanical release free of the shortcomings of conventional systems, an object of the present invention is to provide a device for changing over the electromagnetic release into the mechanical release by means of a simple operation without changing the feeling at the time of the electromagnetic release.

Another object of the present invention is to provide a release mode device for changing the release mechanism out of the electromagnetic release into the mechanical release mode after taking away the battery from the camera.

Further, other objects of the present invention will be understood from the following description with reference to, the drawings showing the embodiments of the present invention.

DESCRIPTION OF THE PREFERRED EMBODIMENT

Figure 1:
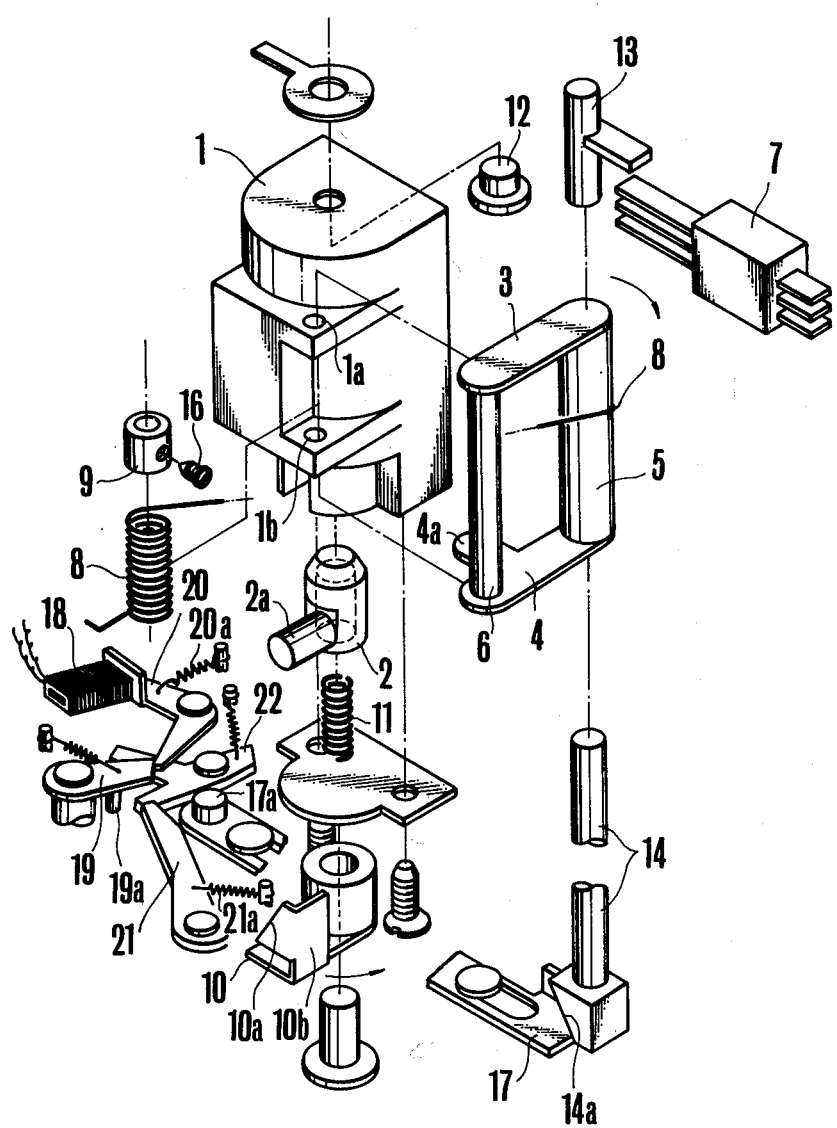
FIG. 1 shows the battery case as an embodiment of the release device of the present invention.
Figure 2:
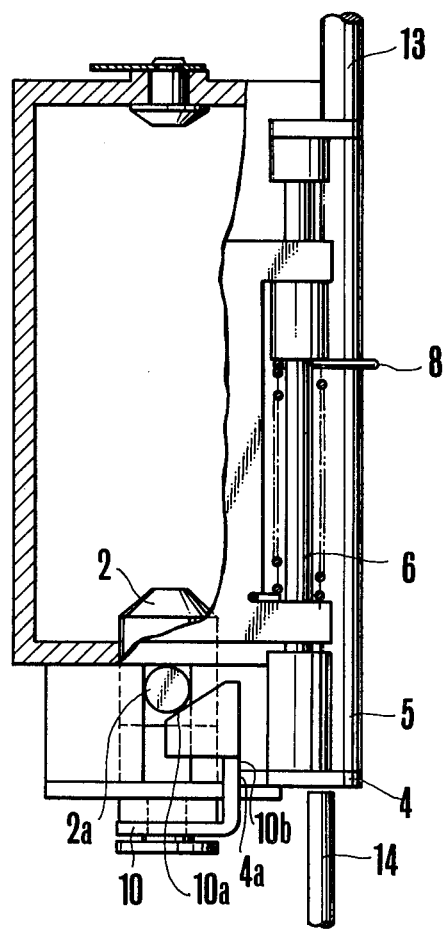
FIG. 2 shows the battery case in FIG. 1, out of which the battery is taken away in side view.
Figure 3:
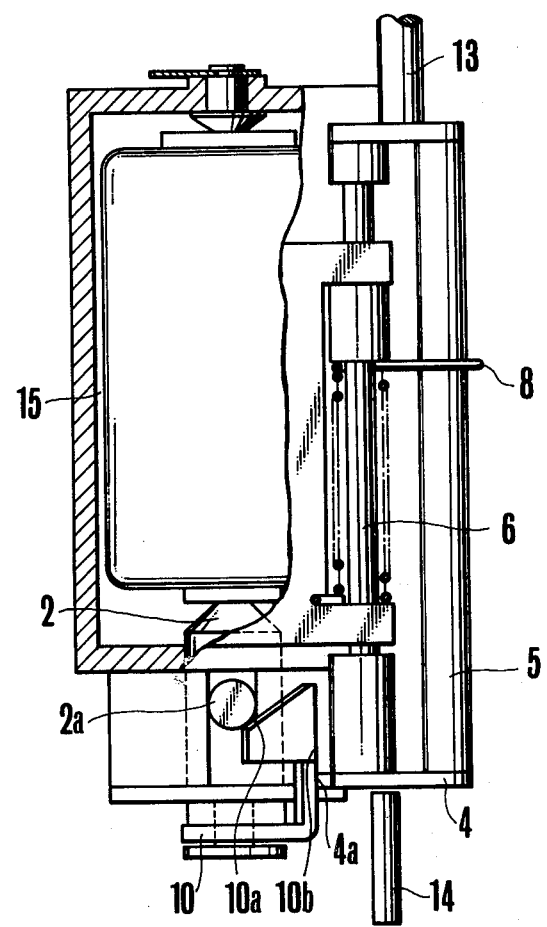
FIG. 3 shows the battery case in FIG. 1, in which the battery is loaded in side view.
Figure 4:
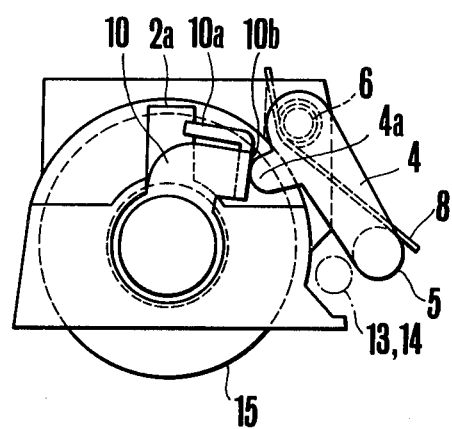
FIG. 4 shows the bottom of the battery case in FIG. 3.

FIG. 1 is an exploded view of a battery case embodying the present invention, FIG. 2 is a side view of the battery case shown in FIG. 1, from which the battery is taken away, FIG. 3 is a side view of the battery case containing the battery. FIG. 4 shows the bottom of the battery case shown in FIG. 2, FIG. 5 shows the bottom of the battery case shown in FIG. 3.

The drawings include a battery case 1 for loading the battery 15, a movable battery contact 2 urged downward against a movable contact spring 11 when the battery is loaded, a release lever 3 fixed on a slide shaft or axis 6 and a release shaft or axis 5 so as to be operated along the direction of the axis and rotation, a change over release 4 fixed on the slide axis 6 and the release axis to switch into a mechanical release in response to the operation of a change over cam. The release axis 5 is fixed on the release lever 3 and the change over lever 4 so as to connect the electromagnetic release axis or release operation member 13 with the mechanical release axis or member 14 when the release is to be mechanically operated. The slide axis 6 is to be rotated with the operation of the change over cam 10 and to move along the axial direction with the electromagnetic release axis 13 when the battery is taken out. An electromagnetic release switch 7 serves for operating the electromagnetic release, a release spring 8 for urging the slide axis 5 upwards and counterclockwise, and a spring stop 9 fixed on the slide axis 6 with the set screw to adjust the strength of the release spring 8. A change over cam is rotated by the movable contact 2 so as to disconnect the release axis 5 when the battery is loaded, and a movable contact spring 11 urges the movable contact 2 upwards. The drawings further show a fixed contact 12 for battery, an electromagnetic release axis 13 operatively engaged with an unshown release button to open and close the electromagnetic release switch 7 and transmit the operation of the release button to the mechanical release axis 14 when the release is to be mechanically operated, so the mechanical release axis 14 operates the mechanical release mechanism, a battery 15, a set screw 16 for securing the spring stop, a mechanical release slide plate 17 for disengaging the automatic diaphragm holding lever 22 from the automatic diaphragm lever 21, and an attraction type magnet 18 for electromagnetic release for attracting the armature 20 against the force of the spring 20a when the current is supplied. An armature 20 disengages the knock lever 19 for disengaging the automatic diaphragm holding lever 22 with the operation of the magnet 18, and is normally separated from the magnet. An automatic diaphragm lever 21 operates the automatic diaphragm, the shutter mechanism and the mirror driving mechanism, and the automatic diaphragm holding lever for holding the automatic diaphragm lever 21.

The operation of the release change over device of the present invention in accordance with FIGS. 1 to 5 is as follows.

Figure 5:
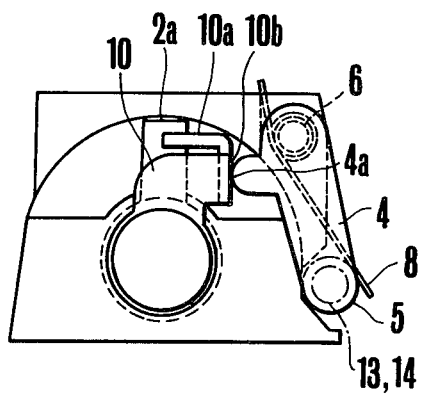
FIG. 5 shows the bottom of the battery case in FIG. 2.

When in FIGS. 1, 2 and 5 the battery is loaded in the battery case 1, the movable contact 2 is pushed down by the contact of the battery 15 and the portion 2a of the movable contact 2 depresses the portion 10a of the change over cam 10 so as to rotate the change over cam 10 counterclockwise (of the arrow). Thus, the portion 10b of the change over cam 10 depresses the portion 4a of the change over lever 4 so as to rotate the lever 4 clockwise (of the arrow). Thus, the release lever 3 and the change over lever 4 withdraw from the connecting position of the electromagnetic release axis 13 and the mechanical release axis 14, and the condition in FIGS. 2 and 5 shifts to the condition in FIGS. 3 and 4. In the state in FIGS. 3 and 4 operation of the electromagnetic release axis 13 engaged with the release button (not shown) opens and closes only the electromagnetic release switch 7 and does not influence the mechanical release axis 14 so that the mechanical release is not operated. When the battery is then taken away and the condition in FIGS. 2 and 5 is established the movable contact 2, the change over cam 10, the release lever 3 and the change over lever 4 resume the positions shown in response to the force of the release spring 8 which moves the electromagnetic release axis 13 and the mechanical release axis 14 so are connected to each other, and a mechanical release is possible. Although at this time the electromagnetic release switch is also opened and closed, the electromagnetic release is not operated because the battery is taken away. When in this state the release button is depressed down the mechanical release axis 14 is pushed downwards and the mechanical release slide plate 17 presses and rotates the automatic diaphragm holding lever 22 clockwise with the pin 17a. This is done in such a manner that the automatic diaphragm holding lever 22 is disengaged from the automatic diaphragm lever 21 and the lever 21 is rotated clockwise by the force of the spring 21a. This drives the not shown shutter mechanism and so on and carries out the diaphragm closing and the shutter release operation.

When using the electromagnetic release the release button is depressed as mentioned above so as to close the switch 7. Current is now supplied to the magnet 18 and the armature 20 is attracted and rotated clockwise so the aperture 20 is disengaged from the knock lever 19. The knock lever 19 is turned counterclockwise to operate the automatic diaphragm holding lever 22 and disengages the automatic diaphragm lever 21, so the shutter release operation and so on are carried out.

In the above embodiment the change over is carried out by mechanically detecting the position of the movable contact when the battery is loaded in the battery case and not. It goes without saying that any system in accordance with which the change over is carried out by mechanically detecting the presence and the absence of the battery in the battery case will do. For example it is possible to provide a pin for detecting the presence of the battery at the side wall of the battery case.

As so far explained in detail in accordance with the embodiments, taking away the battery out of the battery case of the camera changes the electromagnetic release into a mechanical release. Because the release button is common for both the mechanical and the electromechanical release the camera can be used without losing operability even when the battery is absent. An extra operation member is unnecessary on the exterior of the camera. Also, because the change over device of the present invention is not changed over into the mechanical release mode unless the battery is taken away, the consumed battery is seldom left in the battery case. Hence, there is little fear of leakage and production of gas. Further in the device of the present invention if the release mechanism is changed over when the battery is consumed, all the mechanically controlled shutter times can be used different from the system for compulsorily operating the shutter mechanism.

What is claimed is:

1. A release device for a camera comprising:
   (a) a loading portion for holding a battery;
   (b) detection means indicating a first state in which the battery is loaded into said loading portion and indicating a second state in which the battery is absent from the loading portion;
   (c) an electromagnetic release mechanism having electromagnetic means to be activated by the power of a battery loaded into the loaded portion to initiate a release member, and said electromagnetic means being arranged to be activated by actuation of a release operating member for initiating the release member; and
   (d) a mechanical release mechanism, said mechanical release mechanism being operatively coupled with the detection means, and arranged to be set in a non-operative condition when the detection means is in the first state and to set in an operable condition when the detection means is in the second state and being arranged for actuating the release member mechanically.

2. A release device for a camera comprising:
   (a) a loading portion for holding a battery;
   (b) a release operation member;
   (c) switch means to be switched by the operation of the release operation member;
   (d) electromagnetic means for receiving power from a battery load into the loading portion and through said switching means;
   (e) a release arrangement driven by the electromagnetic means;
   (f) detection means indicating a first state in which the battery is loaded into the loading portion and indicating a second state in which the battery is absent from the loading portion; and
   (g) connecting means operatively coupled to the electromagnetic means, said connecting means being arranged for mechanically linking the release operation member and the release arrangement when the detection means is in the second state for mechanically driving the release arrangement in an association with the operation of the release operation member, said connecting means being arranged for releasing the mechanical linking between the release operation member from the release arrangement when the detection means is in the first state.

3. A release device for a camera comprising:
   (a) a battery housing chamber to house a battery and having an inner face, said housing chamber having a projection member therein for holding the battery in a pressure contact manner against the face of the chamber, said projection member being arranged to indicate a first position when the battery is held in a pressure contact manner against the inner face of the housing chamber, and is shifted from the first position to a second position when the battery is taken out of the housing chamber;
   (b) an electromagnetic release mechanism, a release arrangement, a release operation member, said mechanism having electromagnetic means to be activated by power from a battery housed in the battery housing chamber for initiating the release arrangement, and said electromagnetic means arranged to be activated by operation of the release operation member for initiating the release arrangement; and (c) a mechanical release mechanism, said mechanical release mechanism being operatively coupled to the projection member and arranged to be retained in an inoperative state when the projection member is in the first position and to be placed in an operable state in association with shifting of the projection member from the first position to the second position for initiating the release arrangement mechanically.

4. A release device for a camera comprising:

(a) a battery housing chamber to house a battery and having an inner surface, said housing chamber having a projection member for holding the battery by pressure contact against the inner surface, said projection member being arranged to occupy a first position when the battery is held by pressure contact, and being arranged to be shifted from the first position to a second position when the battery is taken out of the housing chamber;

(b) a release operation member;

(c) switch means to be switched by operation of the release operation member;

(d) electromagnetic means having a power supply controlled from the power of the battery housed in the housing chamber by the switching of the switch means;

(e) a release member arranged to be driven by the electromagnetic means; and (f) a coupling member operatively coupled to the projection member, a mechanical linkage between the release operation member and the release member, said coupling member being arranged to be placed in a position to disconnect the mechanical linkage between the release operation member and the release member when the projection member is in the first position, also being arranged to be shifted to a position to mechanically link the release operation member and the release member in association with the shifting of the projection member from the first position to the second position for mechanically driving the release member in association with the operation of the release operation member.

5. A release device for a camera according to claim 3, wherein the projection member forms a contact piece for the battery.

6. A release device for a camera according to claim 4, wherein the projection member forms a contact piece for the battery.

* * * * *